(12) United States Patent
Von Werder (10) Patent No.: US 7,614,416 B2
(45) Date of Patent: Nov. 10, 2009

(54) PROCESS FOR PRODUCING A THROTTLE-VALVE HOUSING AND A THROTTLE VALVE

(76) Inventor: Martin Von Werder, Bramkampredder 140, Ammersbek (DE) 22949

( * ) Notice: Subject to any disclaimer, the term of this patent is extended or adjusted under 35 U.S.C. 154(b) by 0 days.

(21) Appl. No.: 10/786,417

(22) Filed: Feb. 26, 2004

(65) Prior Publication Data

US 2004/0163703 A1    Aug. 26, 2004

Related U.S. Application Data

(63) Continuation of application No. PCT/DE02/03241, filed on Aug. 30, 2002.

(30) Foreign Application Priority Data

Aug. 31, 2001   (DE) ................ 101 42 452

(51) Int. Cl.
*F16K 1/18*   (2006.01)
(52) U.S. Cl. .............. 137/15.25; 137/315.22; 251/305; 29/890.127; 264/259
(58) Field of Classification Search .......... 137/15.25, 137/315.22, 315.24; 251/305, 308; 29/890.12, 29/890.126, 890.127; 264/239, 259
See application file for complete search history.

(56) References Cited

U.S. PATENT DOCUMENTS 5,098,064 A   3/1992  Daly et al.
5,275,375 A   1/1994  Semence (Continued)

FOREIGN PATENT DOCUMENTS

DE   3937281   5/1991

(Continued)

OTHER PUBLICATIONS

Derwent Abstract 19820614C1; Aug. 19, 1999; Xomox International GmbH & Co; D-88131 Lindau.

(Continued)

*Primary Examiner*—Kevin Lee
(74) *Attorney, Agent, or Firm*—Siemens AG; Jacob Eisenberg (57) ABSTRACT

The present invention is related to a method for the production of a throttle valve connection piece housing and a throttle valve as molded injection parts. The throttle valve connection piece housing is provided with a throughflow opening which can be sealed by the throttle valve. Along a pivoting axis extending perpendicular to the longitudinal axis of the throughflow opening, the throttle valve is provided with a continuous shaft hole into which a throttle valve shaft can be inserted in a rotationally fixed manner, the two ends of the shaft protruding from the shaft hole in such a way that they protrude into coaxial bearing holes in the throttle valve connector piece housing which are coaxial to the shaft hole. When the throttle valve is in a closed position, the radial peripheral edge thereof rests on the inner wall of the throughflow opening. The throttle valve connector piece housing is produced together with the closed-position throttle valve as a single injection molded piece in an injection mold. The radial peripheral edge of the throttle valve is joined to the inner wall of the throughflow opening and, after solidification of the de-molded injection molded part, the throttle valve is separated along the radial peripheral edge thereof from the inner wall of the throughflow opening by cutting.

18 Claims, 6 Drawing Sheets

U.S. PATENT DOCUMENTS

| | | | |
|---|---|---|---|
| 5,374,031 A | | 12/1994 | Semence et al. |
| 5,421,718 A | | 6/1995 | Karlsson et al. |
| 5,794,591 A | * | 8/1998 | Kalebjian et al. ...... 29/890.127 |
| 5,941,270 A | * | 8/1999 | Nogle .................... 137/112 |
| 6,840,260 B2 | * | 1/2005 | von Willich ............ 137/15.25 |
| 6,901,942 B2 | * | 6/2005 | Krimmer et al. ......... 137/15.25 |

FOREIGN PATENT DOCUMENTS

| | | |
|---|---|---|
| DE | 19820614 | 8/1999 |
| DE | 10105526 A1 * | 8/2002 .............. 137/15.25 |

OTHER PUBLICATIONS

Derwent Abstract 3937281A; May 16, 1991; KSB Aktiengesellschaft, D-6710 Frankenthal.

* cited by examiner

PROCESS FOR PRODUCING A THROTTLE-VALVE HOUSING AND A THROTTLE VALVE

CROSS REFERENCE TO RELATED APPLICATIONS

The present application is a continuation of international application PCT/DE02/03241, filed Aug. 30, 2002, and further claims priority to German patent application DE 10142452.3, filed Aug. 31, 2001; the both of which are herein incorporated by reference.

BACKGROUND OF THE INVENTION

The present invention relates to a process for producing a throttle-valve and its housing. The two may be used in a motor vehicle and comprise injection moldings. The throttle-valve housing has a through-flow orifice which can be blocked off by the throttle valve. The valve includes a pivot axis which extends transversely to the longitudinal axis of the passage orifice and along which the throttle valve has a continuous shaft bore. The throttle-valve shaft can be inserted into the bore in a rotationally fixed manner. The ends of the shaft project out of the bore on opposing sides and into bearing bores in the housing. The bearing bores are coaxial with respect to the shaft bore. The throttle valve, in its closed position, bears against the inner wall of the through-flow orifice by means of its radially encircling edge.

For throttle-valve housings, it is particularly important for the through-flow orifice to be blocked off as completely as possible when the throttle valve is in its closed position. This is particularly necessary if the throttle-valve housing is arranged in the air supply line of an internal combustion engine.

Throttle-valve housings are often produced by injection molding. Due to manufacturing tolerances, the through-flow orifice cannot be substantially completely blocked off. To eliminate this drawback, it is known for a plastic throttle valve to be injection-molded separately into a throttle-valve housing which has already been fully produced. Accordingly, the throttle valve is matched to the throttle-valve housing.

This process is highly complex, in particular, on account of the two injection-molding processes.

SUMMARY OF THE INVENTION

It is an object of the invention to provide a process of the type described in the introduction which provides for a throttle-valve housing which is simple to assemble and ensures at least substantially complete blocking of the through-flow orifice while entailing a low level of production outlay.

According to the invention, this object and other objects are achieved by virtue of the fact that the throttle-valve housing together with the throttle valve in its closed position is produced as a single-piece injection molding in an injection mold. The throttle valve is connected, at its radially encircling edge, to the inner wall of the through-flow orifice, and the throttle valve is separated from the inner wall of the through-flow orifice along its radially encircling edge by a cut after the demolded injection molding has solidified.

Since the cutting line formed when separating the throttle valve from the inner wall of the through-flow orifice is identical at throttle valve and through-flow orifice, the through-flow orifice is at least substantially completely blocked off when the throttle valve is in its closed position. This is effected without the need for further machining of the throttle valve and the inner wall of the through-flow orifice.

The single injection-molding operation which is required leads to a further considerable reduction in the production outlay.

If the throttle valve is produced with a low thickness along its radially encircling edge, which is connected to the inner wall of the through-flow orifice, it is easy to separate the throttle valve from the inner wall of the through-flow orifice and to avoid distortion to the regions which are to be cut. This also means that only relatively slight forces are required to separate the throttle valve from the inner wall of the through-flow orifice.

To achieve not only an optimally closing seating of the throttle valve, in its closed position, against the inner wall of the through-flow orifice, but also, at the same time, in this position to orient the shaft bore in the throttle valve with respect to the bearing bores in the throttle-valve housing, so as to produce the shaft bores in the throttle valve and the bearing bores in the throttle-valve housing, two core parts can be inserted coaxially with respect to one another into an injection mold. The core parts can be moved away from one another in the axial direction for demolding purposes and bear against one another by means of their mutually facing end sides during the injection operation. In the region of the shaft bore, the parts may have a cross section which corresponds to the shaft bore and in the regions of the bearing bores have cross sections which correspond to the bearing bores. After the throttle valve has been separated, it becomes necessary for a throttle-valve shaft to be introduced into the shaft bore through the bearing bores. If the bearing bores are to receive bearings for the throttle-valve shaft, the bearing bores, in order to accommodate bearings, in particular rolling-contact bearings for the pivotable mounting of the throttle-valve shaft, may have a larger cross section than the cross section of the shaft bore.

To enable the throttle valve to be produced with the minimu=possible thickness, the throttle valve can be produced with a hub-like thickened portion, by which the shaft bore is designed to extend through approximately coaxially, In this case, the cross section of the thickened portion of the throttle valve is preferably produced to approximately correspond to the cross section of the bearing bores in the throttle-valve housing.

If the regions of the core parts which correspond to the cross section of the bearing bores are inserted into the injection mold in such a manner to project slightly into the region of the through-flow orifice, the throttle valve is already separated from the throttle-valve housing in the region of the hub-like thickened portion of the throttle valve, with the result that a separating cut is no longer required in this thick-walled region.

One simple way of carrying out the separating cut includes forming the cut by means of a laser beam. According to another possible option, which is likewise simple, the separating cut is made by means of a cutting tool. For this purpose, the cutting tool for carrying out the cutting operation can be introduced axially into the through-flow orifice and can have an encircling cutting edge, the peripheral contour of which corresponds to the inner contour of the through-flow orifice in the region in which the throttle valve, in its closed position, bears against the inner wall of the through-flow orifice.

If the cores have already produced a separation in the region of the hub-like thickened portion, the peripheral contour of the cutting edge may have recesses which approximately correspond to the cross section of the hub-like thickened portion of the throttle valve.

To enable the throttle valve to be stamped out substantially simultaneously, when the throttle valve is inclined in the usual way in the closed position, the throttle valve, in its closed position, may be produced so as to be inclined with respect to the longitudinal axis of the passage orifice at an angle which differs from a right angle by a few degrees. The cutting plane of the cutting tool, which is defined by the peripheral contour of the cutting edge, may be introduced into the passage orifice for the purpose of the cutting operation in a position in which it is inclined at approximately the same angle with respect to the longitudinal axis of the passage orifice.

The throttle-valve housing and the throttle valve can be produced as a plastic injection molding.

Particularly in the case of a thin radially encircling edge of the throttle valve, the throttle-valve housing and the throttle valve may be produced as a light-metal injection molding, in particular as an aluminum injection molding.

BRIEF DESCRIPTION OF THE SEVERAL VIEWS OF THE DRAWINGS

An exemplary embodiment of the invention is illustrated in the drawings and described in more detail below, wherein.

DETAILED DESCRIPTION OF THE INVENTION

Figure 1:
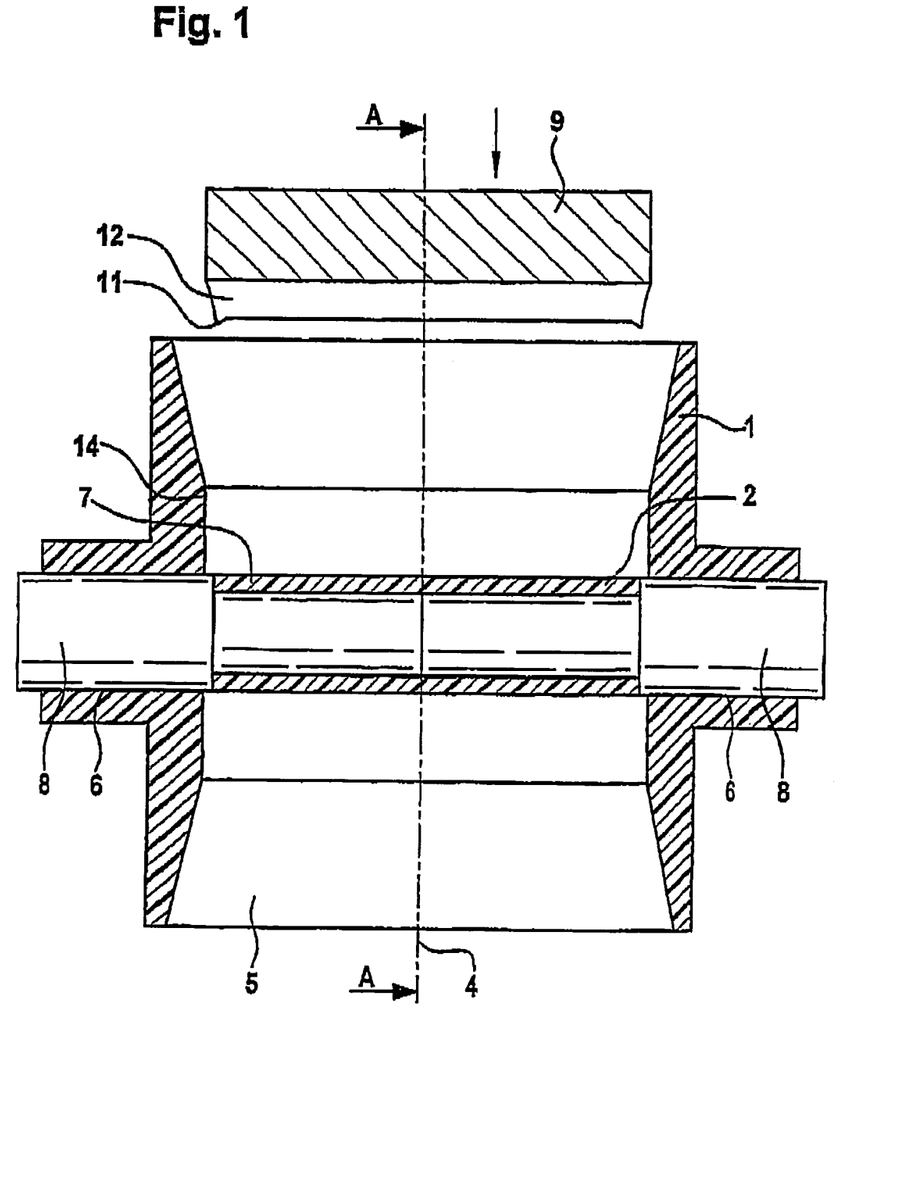
FIG. 1 depicts a throttle-valve housing, which has been demolded apart from the cores for shaft bore and bearing bores, with throttle valve and cutting tool ready for operation, in section along the shaft bore.

FIG. 1 depicts a single-piece injection molding made from plastic, which comprises a throttle-valve housing 1 and a throttle valve 2. The injection molding has already been removed from its outer injection mold.

FIG. 1 depicts a longitudinal section through throttle-valve housing 1 and throttle valve 2, which centrally intersects a shaft bore 3 of the throttle valve 2, which extends transversely with respect to the longitudinal axis 4 of a continuous passage orifice 5 of the throttle-valve housing 1.

In the region of the throttle valve 2, the passage orifice 5 is designed with a cylindrical cross section, whereas those regions of the passage opening 5 which adjoin it on each side widen conically toward the locations where they open out to the side.

Bearing bores 6, which have a larger diameter than the shaft bore 3, are formed coaxially with respect to the shaft bore 3 on both sides in the wall of the throttle-valve housing 1. This larger diameter of the bearing bores 6 corresponds to the diameter of a hub-like thickened portion 7 of the throttle valve 2, through which the shaft bore 3 extends coaxially and in which the latter is formed.

Two core parts 8, which are designed to be stepped in accordance with the shaft bore 3 and bearing bores 6 which are formed to match these core parts and which bear against one another by means of the end sides of the free ends of their small stepped portions, are still arranged in the shaft bore 3 and the bearing bores 6, having been there since the casting operation. The large stepped portions of the core parts 8, at their transition to the small stepped portions, project into the passage orifice 5 by a small amount, so that after the core parts 8 have been removed the throttle valve 2 is not connected to the throttle-valve housing 1 in the region of the hub-like thickened portion 7. A cutting tool 9 is already present above the throttle-valve housing 1, ready for operation.

Figure 2:
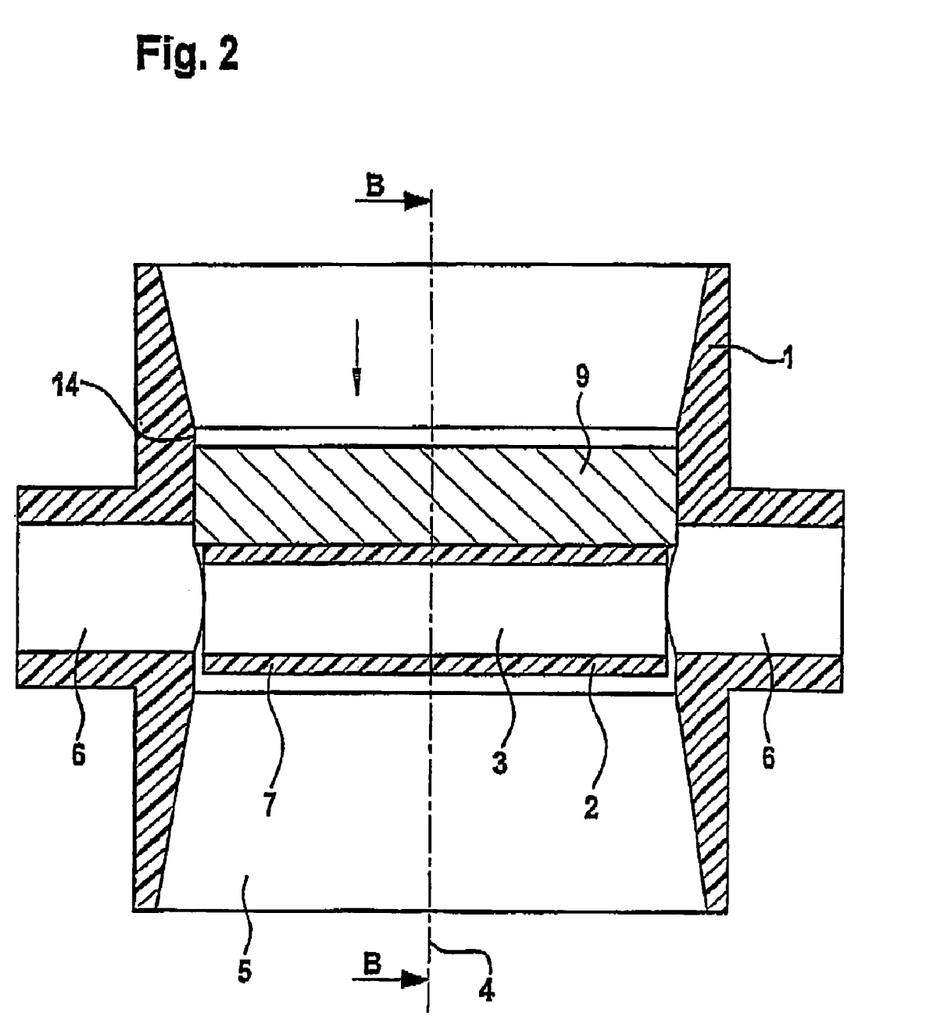
FIG. 2 depicts the throttle-valve housing with throttle valve shown in FIG. 1 with the cutting tool in the cutting position, in section along the shaft bore.
Figure 3:
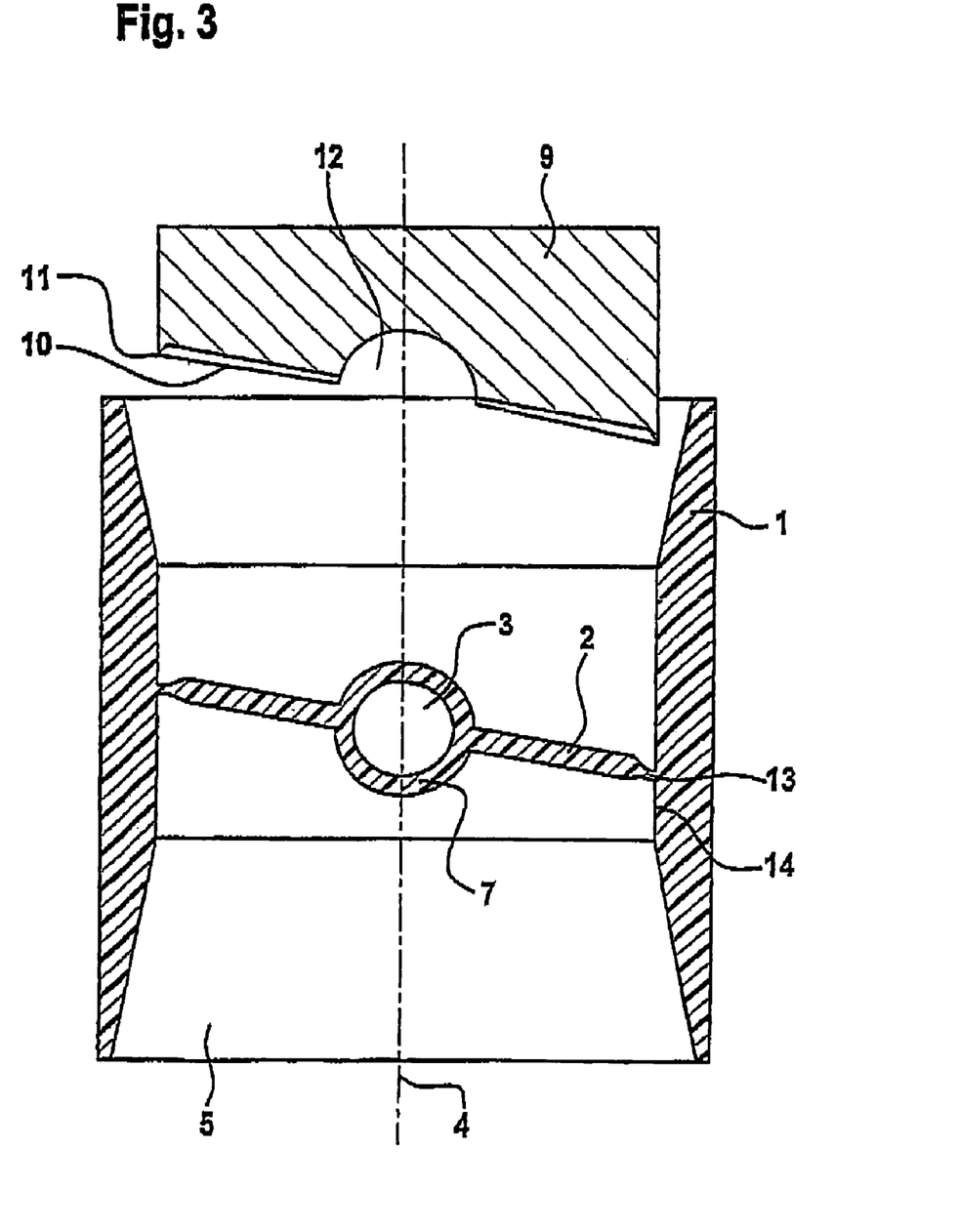
FIG. 3 depicts a sectional view of the throttle-valve housing with throttle valve and cutting tool on line A—A in FIG. 1.
Figure 5:
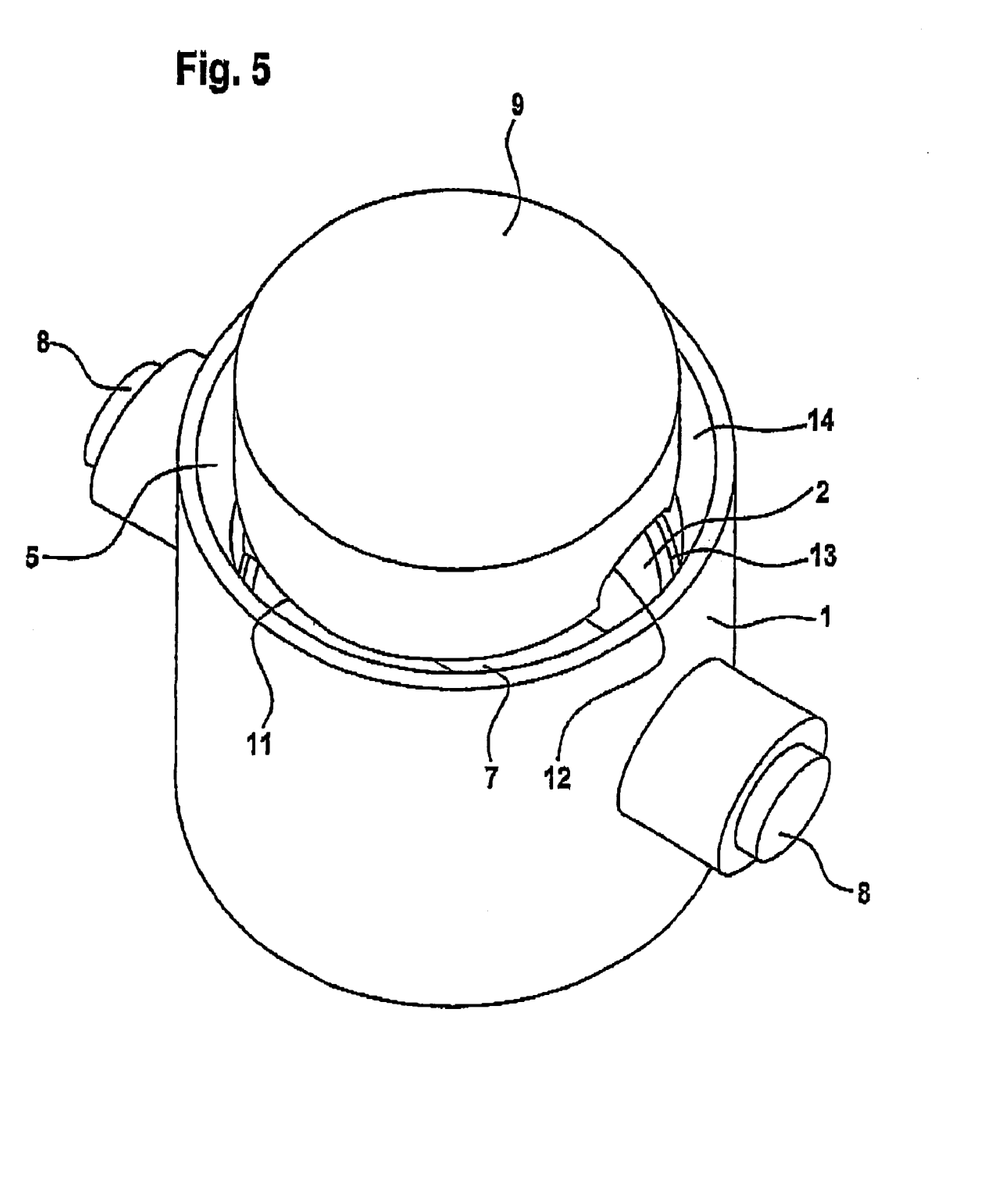
FIG. 5 depicts a perspective view of throttle-valve housing, throttle valve and cutting tool as shown in FIG. 1.

The illustration presented in FIG. 5 represents a perspective view corresponding to FIGS. 1 and 2, It can be seen from the sectional view on line A—A in FIG. 1, which is illustrated in FIG. 3, that the throttle valve 2 is in its closed position, in which it is inclined with respect to the longitudinal axis 4 of the passage orifice 5 by an angle which differs by a few degrees from a right angle. The cutting plane 10 of the peripheral contour of the cutting edge 11 of the cutting tool 9 is inclined at the same angle with respect to the longitudinal axis 4. This peripheral contour corresponds to the peripheral contour of the passage orifice 5 in its cylindrical part.

The cutting edge 11 has two diametrically opposite recesses 12 which match the cross section of the hub-like thickened portion 7 of the throttle valve 2. As can be seen clearly from FIG. 3, the throttle valve 2 is integrally connected, along its radially encircling edge 13, to the throttle-valve housing 1, the thickness of the throttle valve 2, in the region of its encircling edge 13, being significantly less than in the remaining region of the throttle valve 2.

Figure 4:
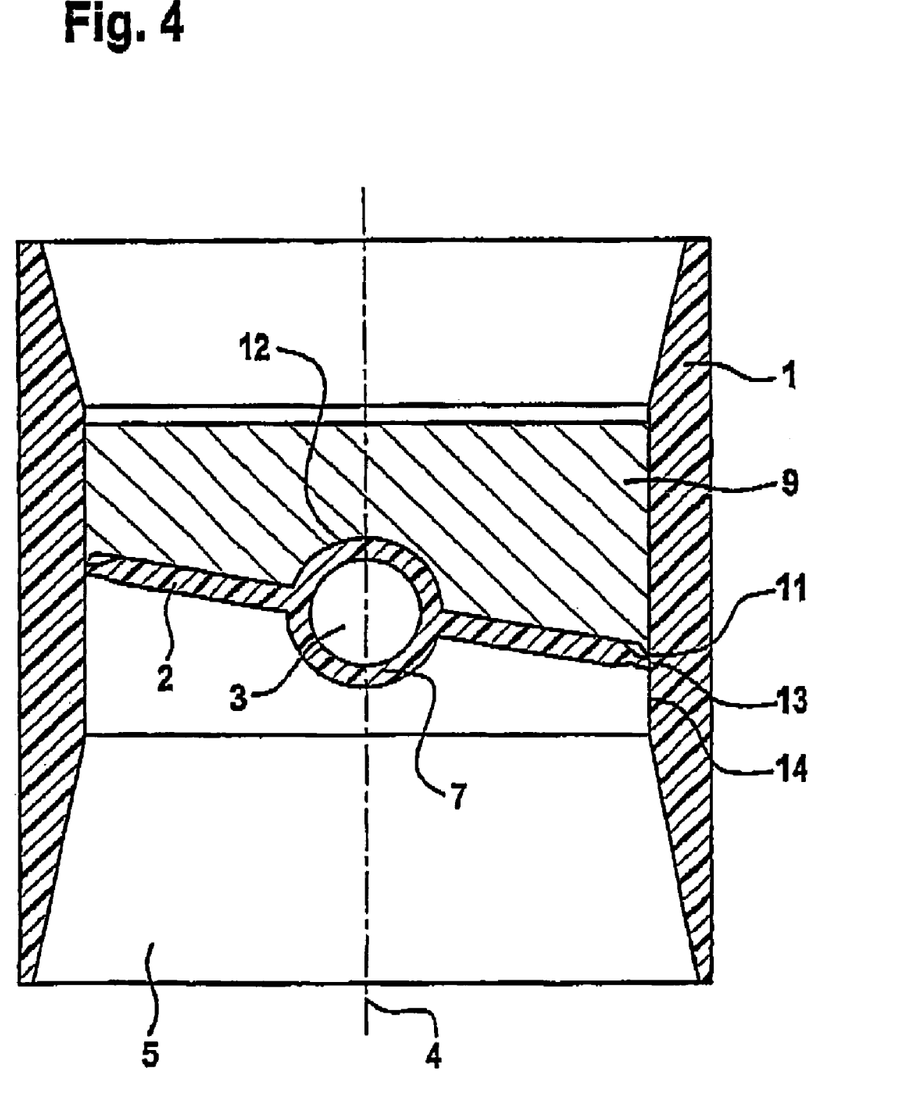
FIG. 4 depicts a sectional view of the throttle-valve housing with throttle valve and cutting tool on line B—B in FIG. 2.

In FIGS. 2 and 4, the core parts 8 have already been removed, and the cutting tool 9 has been moved coaxially into the passage orifice 5 sufficiently far for its cutting edge 11 to have severed the connection between the throttle valve 2, along its encircling edge, and the inner wall 14 of the throttle-valve housing 1. This separating cut is an axial continuation of the inner wall 14 of the passage orifice 5.

Figure 6:
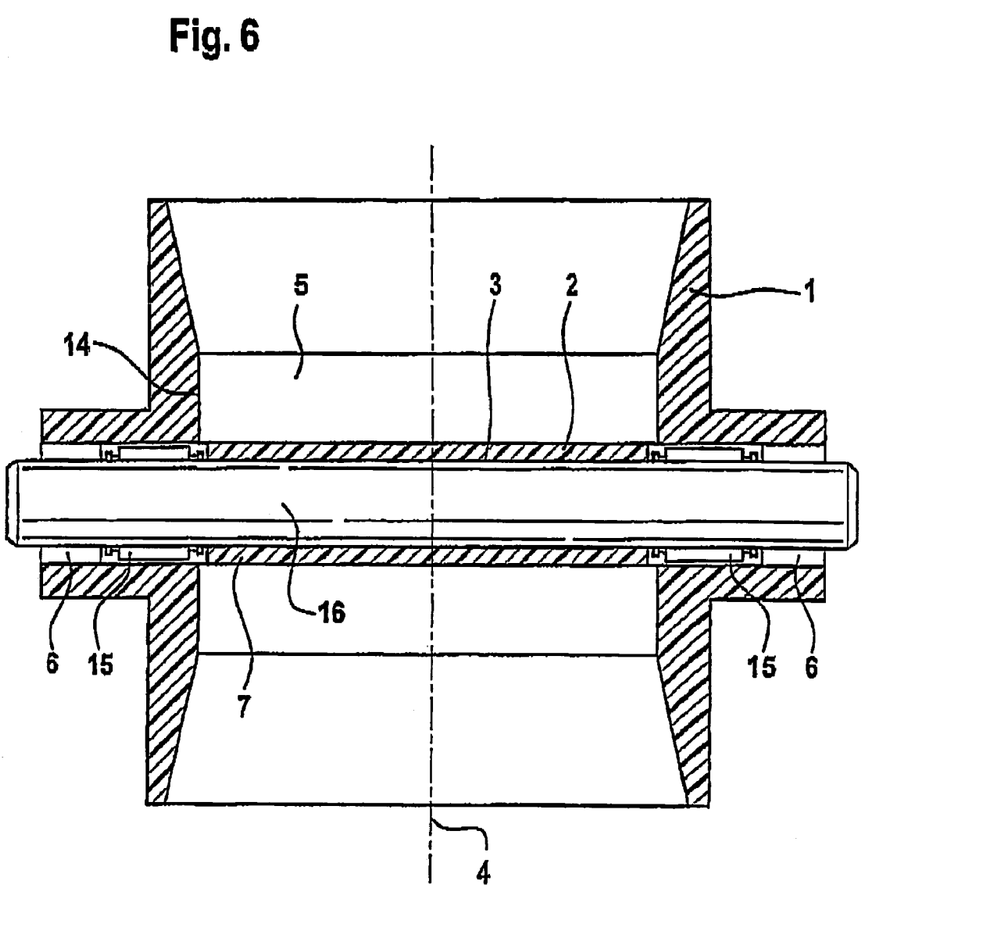
FIG. 6 depicts a sectional view, along the shaft bore, of a throttle-valve casing comprising throttle-valve housing with throttle-valve shaft mounted on bearings and throttle valve.

In FIG. 6, the cutting tool 9 has already been removed, rolling-contact bearings 15 have been inserted into the bearing bores 6 of the throttle-valve housing 1 and a throttle-valve shaft 16 has been introduced through the rolling-contact bearings 15 into the shaft bore 3 of the throttle valve 2 in such a way that the throttle valve 2 is connected in a rotationally fixed manner to the throttle-valve shaft 16.

As a result of the way in which throttle valve 2, shaft bore 3 and bearing bores 6 have been produced at a component which was only divided into two parts by the separating cut made by the cutting tool 9, the arrangement of the components of the assembled throttle-valve housing is such that the throttle valve 2, in its closed position, bears in an accurately fitting manner against the interface with the inner wall 14 of the passage orifice 5 by means of its encircling edge 13 and completely blocks off this passage orifice 5.

I claim:

1. A method of making a throttle-valve housing and a throttle valve, comprising the steps of:

fabricating said housing and valve as a single cast injection molding, said housing comprising inner walls defining an internal through-opening, said valve comprising a radially encircling edge in contact with said inner wall;

demolding a cast after said cast hardens;

cutting along said edge so as to separate said valve and housing;

providing a pair of opposing bearing bores in said housing, said bearing bores shaped and positioned to accommodate said ends therein;

inserting a core part in each of said bearing bores, each of said part having a diameter substantially equivalent to an internal diameter of said bearing bore and an outer diameter of said shaft bore, said bore further having a flat side face which faces one another when each of said bores is inserted into each of said bearing bores;

wherein said opening comprises a central longitudinal axis and said method further comprises the step of pivotably mounting said valve along a pivot axis, said pivot axis extending transverse to said central axis; and wherein said throttle valve comprises a shaft and a shaft bore positioned on said pivot axis said shaft bore shaped so as to rotatably accommodate a portion of said shaft therein, and said method further comprising the step of mounting said shaft into said shaft bore such that ends of said shaft extend beyond said shaft bore.

2. The method according to claim 1, wherein said valve is in a closed position when said edge contacts said inner wall, said closed position being defined by the breaking of passage through said opening by said valve.

3. The method according to claim 1, further comprising the step of fitting said housing and valve for use in a motor vehicle.

4. The method according to claim 1, wherein said bearing bores have a larger cross section than said shaft bore.

5. The method according to claim 4, further comprising the step of inserting at least one bearing into each of said bearing bores between said end and said bearing bore internal wall thereby facilitating rotation of said ends within said bearing bores.

6. The method according to claim 5, wherein said at least one bearing is a rolling-contact bearing.

7. The method according to claim 1, wherein said throttle valve comprises a hub-like thickened portion through which said shaft bore extends substantially coaxially.

8. The method according to claim 7, wherein a cross section of said thickened portion is produced to approximately correspond to a cross section of said bearing bores.

9. The method according to claim 1, wherein said step of inserting further comprises the step of inserting a portion of each of said parts into said opening via said bearing bores.

10. The method according to claim 1, wherein said step of cutting further comprises the step of using a laser to perform said step of cutting.

11. The method according to claim 1, wherein said step of cutting further comprises the step of using a cutting tool to perform said step of cutting.

12. The method according to claim 8, wherein said step of cutting further comprises the step of using a cutting tool to perform said step of cutting.

13. The method according to claim 12, wherein said cutting tool is introduced axially into said opening and has an encircling cutting edge a peripheral contour of which corresponds to an inner contour of said opening, said inner contour being located proximate to said throttle valve.

14. The method according to claim 13, wherein said peripheral contour comprises recesses which approximately conespond to a cross section of said hub-like thickened portion of the throttle valve.

15. The method according to claim 12, wherein said throttle valve, in said closed position, is inclined to said longitudinal axis at an angle substantially but not eqaal to a right angle inclined with respect to said longitudinal axis, and said peripheral contour further defines a cutting plane inclined at said angle.

16. The method according to claim 1, further comprising the step of producing said throttle-valve housing and throttle valve as a plastic injection molding.

17. The method according to claim 1, further comprising the step of producing said throttle-valve housing and throttle valve as a light-metal injection molding.

18. The method according to claim 17, wherein said light metal comprises aluminum.

* * * * *